United States Patent Office 3,534,465
Patented Oct. 20, 1970

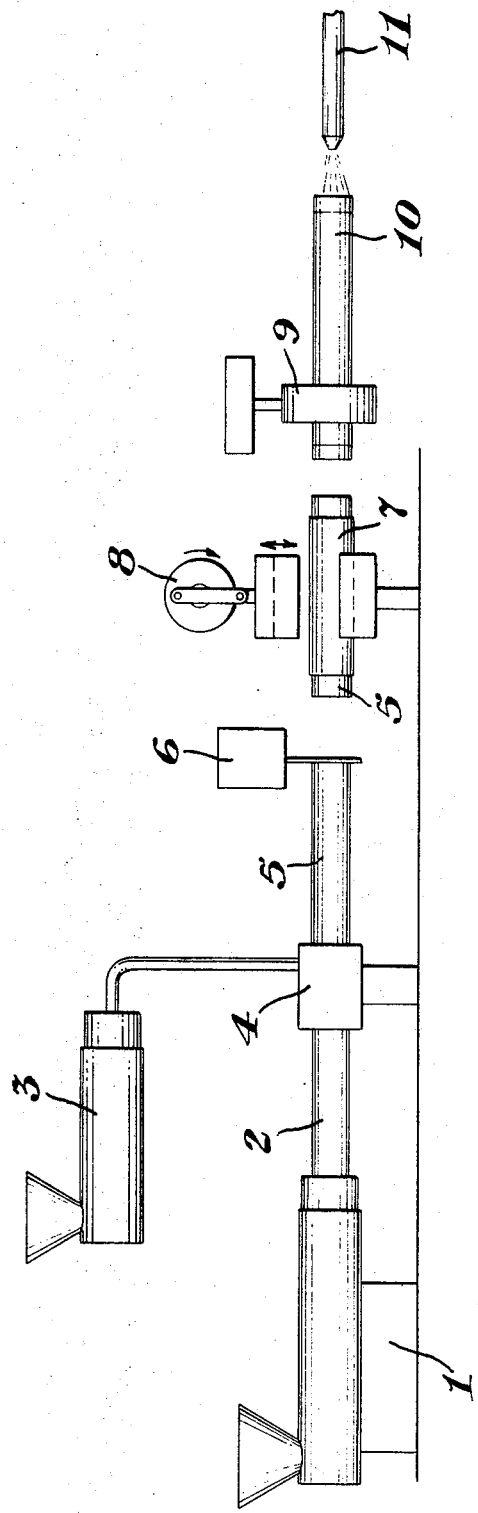

3,534,465
METHOD FOR LINING VESSELS
Paul Meeske, Midland, Mich., assignor to The Dow Chemical Company, Midland, Mich., a corporation of Delaware
Filed Feb. 9, 1968, Ser. No. 704,322
Int. Cl. B23k *31/02;* B21d *39/00*
U.S. Cl. 29—475
14 Claims

ABSTRACT OF THE DISCLOSURE

A method for lining pipes and other tubular shaped vessels with resinous thermoplastic materials. Thermoplastic pipe liners are pre-treated with an adhesive resinous material, swaged with a close-fitting metal pipe and heated by induction to effect bonding of liner and pipe without breaking down the compressive stresses set up in the pipe liner by the swaging.

---

This invention relates to an improved method for swaging pipes and thermoplastic liners employing a thermoplastic adhesive to effect a bond that is better than any heretofore made.

Lined pipe and methods for lining pipe with a synthetic resilient plastic lining are not broadly new. Present methods which are used in the trade include one described in U.S. Pat. No. 2,027,961. This method encompasses the use of compressed air and heat to effect union between the pipe and a liner of vinyl chloride-vinyl acetate copolymer. Another method is disclosed in the Encyclopedia of Chemical Technology, vol. 14, Interscience, New York, N.Y. (1955). A polyvinylidene chloride lined pipe is made by swaging to size an oversized steel pipe on an extruded saran pipe liner.

Although these methods and similar ones have been widely used in the industry, they have not entirely solved the problem of liner distortion and leakage. The combination of temperature cycling along with different coefficients of expansion of the pipe and the liner causes a relaxation of the original stresses within the lined pipe. Such relaxation of stresses results in a loss of the bond between the pipe and the liner, and this permits relative movement subsequently to cause undesirable liner distortion and leakage. The interior of the pipes have been scored to effect better union but this also have been only a partial solution. U.S. Pat. No. 3,315,348 describes a method which employs inserting a plastic liner within a pipe, the inside surface of which has been scored with indentations, swaging the pipe down upon the liner to set up compressive stresses within the liner, rapidly heating the swaged assembly to cause the interfacial layer of the plastic liner to melt and flow into the scored indentations without relaxing the compressive stresses within the liner. This method has gone a long way to solving the inherent problems involved, however, imperfect results are obtained when the heat is too high for too long a time or not high enough. In these cases, compressive stresses within the liner are lost or conversely, union between pipe and liner lacks the desired adherence. As the metallic pipe is a good conductor of heat, care must be taken not to overheat the body of the liner and yet at the same time produce a sufficient heat to cause melting of the outer surface or interfacial layer of said liner. Most of the materials from which such liners are made have relatively high melting points. Consequently, relatively high heat is necessary to effect such melting.

I have greatly improved on this last described method by adding a step of adhesion. My method eliminates guesswork and reduces end-product rejections. The absence of a suitable bond between the pipe and liner is now corrected without application of such high heats as to jeopardize the compressive stresses set up in the liner by the swaging process. Moreover, the metal-adhesive-plastic bond is much better than the metal-plastic bond. According to this invention, these and other disadvantages of the prior art methods of pipe lining are overcome by means of a pipe and liner having a strongly adherent coating of a thermoplastic resinous material. I have found that the union between the metallic pipe and the thermoplastic liner is best made utilizing a strongly adherent coating of a copolymer of a monoolefin and an α,β-monoethylenically unsaturated carboxylic acid. The monoolefin in the copolymer has between 2 and 6 carbon atoms per molecule, inclusive. The α,β-monoethylenically carboxylic acid in the copolymer has between 3 and 8 carbon atoms per molecule, inclusive.

An object of this invention is to provide a novel method for permanently bonding a plastic liner to the interior surface of a pipe utilizing a strongly adherent intermediate coating.

Another object is to provide a novel method for permanently bonding a plastic liner to the interior surface of a pipe without relaxing the internal compressive stresses of said liner.

Still another object is to provide a novel method for bonding a thermoplastic liner to the interior surface of a pipe with a better bond than any heretofore achieved in commercial practice.

Other objects and advantages of this invention will be apparent to one skilled in the art upon reading the accompanying disclosure.

Broadly, the process comprises the steps of coating a thermoplastic liner with an intermediate adhesive resinous material, inserting the coated thermo-plastic liner within a pipe, swaging the pipe down upon the liner to set up compressive stresses within the liner and then passing the swaged assembly through an induction heat coil to rapidly raise the temperature of the pipe just enough that by conductive heat flow the intermediate adhesive layer melts and, upon cooling, permanently and thoroughly bonds the thermoplastic liner and the pipe without relaxing the compressive stresses within the liner. The inner surface of the pipe may be scored if desired but this is not absolutely necessary in view of the adhesive.

More particularly, a preferred embodiment of this invention utilizes the following method. First, the thermoplastic liner is extruded. This liner is then put through a cross-head die arrangement whereby the adhesive coating is applied uniformly. The thermoplastic liner can be made of polyvinylidene chloride or fluoride, the polyvinyls, polyethylene, polypropylene, the polychloro or fluoro ethylene and the like. The outer diameter of the liner preferably approximates the finished inner diameter of the pipe to be lined. The pipe may comprise steel, stainless steel, cast iron, copper, brass, lead, or similar metal customarily used for pipes. As indicated, the inside surface of the pipe may be first scored if desired by a picking tool such as a star-shaped wheel which is preferably pulled longitudinally through the pipe to cause scoring and indentations on the inside wall. The coated thermoplastic liner is then cut into desired, fitted lengths and placed within the pipe and the assembly is passed through a swaging machine to cause a swaging of the pipe upon the liner. This locked-in plastic liner assembly is then passed through an induction heat coil at a rate such that the metal pipe is heated to a temperature of about 80° to about 250° C. at the interface layer of pipe, adhesive and liner which is above the tack point of the intermediate adhesive resinous material. After a brief period of time, the assembly can be quenched by use of air or water to prevent heating of the bulk of the thermoplastic liner, although with the low heats that are possible to effect melting of the intermediate adhesive, quenching may not be necessary. This is also a function of the melting point of the material to be used as a liner. Thus, for example, if polypropylene is used as liner material, by heating the interface to about 100° C., no quenching would be necessary, yet sufficient melting of the adhesive would occur to effect good bonding. The ends can now be threaded, flanged and the ends of the plastic flanged or molded to form a flat face for a joint surface.

The olefin-acid copolymers contemplated for use as the strongly adhesive resinous material include both the random copolymers and the graft copolymers. These copolymers can be obtained commercially or they can be prepared by a variety of suitable techniques well known in the polymerization art. While the invention is not to be limited or bound by any particular technique for preparing the copolymers, suitable methods for preparing graft copolymers which can be used in the practice of this invention are outlined in U.S. Pats. 3,177,269 and 3,270,090, the disclosure of which are specifically incorporated herein by reference.

In either the random or the graft copolymers suitable for use in fabricating the lined vessels of this invention, it is generarlly preferred that the copolymer contain between about 80 and about 99.5 percent by weight combined olefin and between about 0.5 and about 20 percent by weight cobined acid.

As a general proposition, monoolefins having between 2 and 6 carbon atoms per molecule, inclusive, can be employed in preparing the copolymers which are subsequently used in fabricating the lined vessels of this invention. Exemplary monoolefins within this class include ethylene, propylene, 1-butene, 1-pentene, 2-pentene, 1-hexene, 3-hexene, 3-methylbutene-1, 4-methylpentene-1, and the like. Copolymers employing ethylene as the olefin are generally preferred from the standpoint of economics and because of the ease with which ethylene will react with an acid or with which a homopolymer of it will serve as a base or trunk to which the acid can be grafted.

Any $\alpha,\beta$-monoethylenically unsaturated carboxylic acid having between 3 and 8 carbon atoms per molecule, inclusive, which is copolymerizable with an olefin of the class described or which is suitable for grafting onto a homopolymer of an olefin of the class described, can be used to prepare a copolymer coating useful for fabricating the lined vessels. Exemplary acids including monocarboxylic acids and polycarboxylic acids within this class include acrylic, methacrylic, ethacrylic, crotonic, isocrotonic, tiglic, angelic, senecioic, fumaric, maleic, itasonic, citrasonic, and the like. Among these, acrylic acid ($CH_2=CH-COOH$) is preferred. The term used to describe the acid portion of the copolymer coatings of this invention is intended to include suitable $\alpha,\beta$-monoethylenically unsaturated anhydrides of carboxylic acids such as maleic anhydride. Although maleic anhydride is not a carboxylic acid because it does not have a hydrogen attached to the carboxyl groups, it is considered to be an acid for the purpose of this invention because its chemical reactivity is that of an acid. The acid portion of the copolymer is also intended to include monoesters of the poly-carboxylic acids such as methyl hydrogen maleate, methyl hydrogen fumarate, ethyl hydrogen fumarate, and the like.

The copolymer is extruded at a temperature of about 105° to about 250° C. in the form of a thin molten film which is deposited upon the synthetic resilient plastic liner which preferably is still at a temperature of about 80° to about 250° C.

Further features and advantages of the present invention will become more apparent from the following drawing wherein:

The figure depicts the method of the invention schematically. The synthetic resilient plastic liner 2 is extruded from extruder 1. Intermediate adhesive resinous material is extruded from extruder 3 onto the extruder liner 2 by means of cross-head die 4, to form coated liner 5 which is cut into desired lengths by saw 6. These lengths of coated liner 5 are then inserted into pipe lengths 7 which have an inner diameter just slightly larger than the coated liner outer diameter, and the assembly is swaged with swaging equipment 8. The swaged assembly 10 is then passed through induction heating coil 9 at a rate and temperature sufficient to cause the intermediate resinous material to melt and, upon cooling, effect a strong bond between pipe and liner. Quenching of assembly 10 then can be accomplished by air means 11. Although the operation shown in the figure is more-or-less continuous, this is not necessary to practice the invention. The extruded pipe liner can be coated later in its desired lengths or not and the heating by induction need not follow immediately the swaging operation and so on. However, if quenching is needed, it should be accomplished upon completion of or during the heating phase.

The invention is illustrated more particularly by way of the following, non-limiting examples.

EXAMPLE 1

Polyethylene pipe liner is extruded having an outer diameter of 2¼" and an inner diameter of 1⅞". The polyethylene liner is fed into a cross-head die which applies a molten random copolymer of ethylene/acrylic acid copolymer at a temperature of 218° C. from the die lips to the surface of the heated polyethylene liner. The ethylene/acrylic acid copolymer employed for the coating operation contains 9.1 percent acrylic acid and has a melt index of 3.58 decig./min. The coating is a uniform 10 mil layer. The coated liner is then cut into approximately 10 foot lengths. The polyethylene liner is then placed within a 10 foot long steel pipe having an inner diameter of 2½" and .134" wall and the assembly is swaged to an outer diameter of 2⅜". The swaged ten foot length then is passed through an induction heating coil which carries sufficient current to cause quick heating of the pipe to bring the interface layer temperature to about 100° C. This melts the intermediate adhesive ethylene/acrylic copolymer, causing said copolymer to flow into the indentations on the inside surface of the pipe and effecting, upon cooling, a permanent bonding of liner to pipe. The assembly is quenched to prevent heating of the bulk of the polyethylene liner.

EXAMPLE 2

A polypropylene pipe liner having an outer diameter of 2¼" is extruded, and coated while said liner is at a temperature of about 100° C. The coating is uniformly applied in a 10 mil layer with the use of a cross-head die. The coating comprises a polypropylene/methacrylic acid random copolymer which is prepared by feeding propylene monomers and methacrylic acid monomers in suitable proportions to a reaction zone under conditions of temperature and pressure to form a copolymer of 90% by weight combined propylene and 10% by weight combined methacrylic acid. The coated polypropylene liner is cut and swaged with a steel pipe having a 2½" inner diameter as in Example 1. After swaging, the assembly is heated by passage through an induction heat coil at a rate and temperature sufficient to raise the interlayer surface of metal-adhesive-liner to about 100° C. Upon cooling, the bond of pipe to liner is found to be strong and permanent.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, except as is set forth and defined in the appended claims.

What is claimed is:
1. An improved method for bonding a synthetic resilient plastic liner to the inside surface of a tubular shaped substantially metal vessel which comprises the steps of:
   (a) coating a tubular liner fashioned of a material selected from the group consisting of polyolefins, polyacrylates, polyamides, polyethers, polyesters, polyurethanes and polyvinyls, with a strongly adherent coating of a copolymer of a monoolefin having between 2 and 6 carbon atoms per molecule, inclusive, and an $\alpha,\beta$-monoethylenically unsaturated carboxylic acid having between 3 and 8 carbon atoms per molecule, inclusive,
   (b) inserting said coated liner within said vessel and swaging the vessel onto said liner to cause compressive stresses within said liner,
   (c) heating said vessel and said liner at a rate sufficient to melt said coating but insufficient to relax said compressive stresses within said liner.
2. The method of claim 1 wherein said liner comprises polyethylene.
3. The method of claim 1 wherein said heating of said vessel and said liner is followed by cooling of said liner.
4. The method of claim 1 wherein said liner comprises polyvinylidene chloride.
5. The method of claim 1 wherein said coating comprises between about 80 and about 95.5 percent by weight combined ethylene and between about 0.5 and about 20 percent by weight acrylic acid.
6. The method of claim 1 wherein said liner comprises polypropylene and said coating comprises a copolymer of propylene and acrylic acid.
7. The method of claim 1 wherein the liner is at a temperature of about 80° C. to about 100° C. at time of coating.
8. The method of claim 1 wherein said vessel and said liner is heated to an interface temperature of about 80° to about 100° C.
9. The method of claim 2 wherein said coating is about 10 mils in thickness and contains 9.1 percent by weight acrylic acid.
10. An improved method for bonding a synthetic resilient liner to the inside surface of a metal pipe which comprises the steps of:
   (a) scoring the inside surfaces of said metal pipe by pulling a scoring tool longitudinally therethrough to form indentations within said surface,
   (b) coating a tubular liner fashioned of a material selected from the group consisting of polyolefins, polyacrylates, polyamides, polyethers, polyesters, polyurethanes and polyvinyls, with a strongly adherent coating of a copolymer of a monoolefin having between 2 and 6 carbon atoms per molecule, inclusive, and an $\alpha,\beta$-monoethylenically unsaturated carboxylic acid having between 3 and 8 carbon atoms per molecular, inclusive,
   (c) inserting said coated liner within said metal pipe, the outside diameter of said liner being substantially equal to the inside diameter of said pipe, and swaging the pipe into intimate contact with said liner to cause compressive stresses within said liner.
   (d) passing the resultant pipe-liner assembly through an induction heating coil at a rate sufficient to melt said coating to cause said coating to flow into the scored indentations but insufficient to relax said compressive stresses within said liner to effect a permanent bond of said liner to said pipe after cooling.
11. The method of claim 9 followed by a step which comprises quenching said lined pipe with a cooling medium.
12. The method of claim 9 wherein the liner is at a temperature of about 80° C. to about 250° C. at time of coating.
13. The method of claim 9 wherein said liner comprises polyethylene and said coating comprises a copolymer of ethylene and acrylic acid.
14. The method of claim 9 wherein said liner comprises polypropylene and said coating comprises a copolymer of propylene and acrylic acid.

References Cited
UNITED STATES PATENTS

| | | |
|---|---|---|
| 1,708,141 | 4/1929 | Kepler. |
| 2,664,373 | 12/1953 | Reilly. |
| 2,828,537 | 4/1958 | Pischke et al. _____ 29—517 |
| 3,239,931 | 3/1966 | Guarnaschelli _____ 29—520 |
| 3,315,348 | 4/1967 | Donovan et al. ____ 29—516 X |

CHARLIE T. MOON, Primary Examiner

U.S. Cl. X.R.
29—516; 138—141